US012304580B2

(12) United States Patent
Ojima et al.

(10) Patent No.: US 12,304,580 B2
(45) Date of Patent: May 20, 2025

(54) VEHICLE SYSTEM

(71) Applicant: HONDA MOTOR CO., LTD., Tokyo (JP)

(72) Inventors: Yosuke Ojima, Tokyo (JP); Munetsugu Hanji, Tokyo (JP); Satoshi Nakahara, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 693 days.

(21) Appl. No.: 17/678,224

(22) Filed: Feb. 23, 2022

(65) Prior Publication Data
US 2022/0306189 A1    Sep. 29, 2022

(30) Foreign Application Priority Data

Mar. 23, 2021   (JP) ................. 2021-048842

(51) Int. Cl.
*B62D 6/00*   (2006.01)
*B60K 35/00*   (2024.01)
(Continued)

(52) U.S. Cl.
CPC .............. *B62D 6/008* (2013.01); *B60K 35/00* (2013.01); *B62D 5/0481* (2013.01);
(Continued)

(58) Field of Classification Search
CPC .. B62D 6/008; B62D 5/0481; B62D 15/0235; B60K 35/00; B60K 35/28; B60K 2360/162; B60K 35/22
(Continued)

(56) References Cited

U.S. PATENT DOCUMENTS 9,205,867 B2 * 12/2015 Takeda .................... B62D 6/003
2010/0154697 A1 * 6/2010 Ito .......................... B63H 25/36
114/144 RE
(Continued)

FOREIGN PATENT DOCUMENTS

CN          1966335 A    5/2007
CN        104602989 A    5/2015
(Continued)

OTHER PUBLICATIONS

Notice of Reasons for Refusal for Japanese Patent Application No. 2021-048842 dated Sep. 20, 2022; 7 pp.
(Continued)

*Primary Examiner* — Jacob D Knutson
*Assistant Examiner* — Mohamed M Medani
(74) *Attorney, Agent, or Firm* — Armstrong Teasdale LLP

(57) ABSTRACT

A vehicle system includes: a steering device including an operation member, a turning member mechanically separated from the operation member and configured to turn a wheel, a reaction force actuator configured to apply a reaction force to the operation member, and a turning actuator configured to drive the turning member; a controller; and a display device. The controller is configured to determine whether a steering angle of the operation member and a turning angle of the wheel are in a phase deviation state, and cause the display device to perform a guidance display and an actual state display in a case where the steering angle and the turning angle are in the phase deviation state, the guidance display prompting a driver to perform an operation for phase matching to improve the phase deviation state, the actual state display indicating an actual turning state of the wheel.

9 Claims, 11 Drawing Sheets

(51) Int. Cl.
  *B60K 35/22* (2024.01)
  *B60K 35/28* (2024.01)
  *B62D 5/04* (2006.01)
  *B62D 15/02* (2006.01)

(52) U.S. Cl.
  CPC .......... *B62D 15/0235* (2013.01); *B60K 35/22* (2024.01); *B60K 35/28* (2024.01); *B60K 2360/162* (2024.01)

(58) Field of Classification Search
  USPC ........................................................ 180/402
  See application file for complete search history.

(56) References Cited

U.S. PATENT DOCUMENTS

| 2016/0039457 | A1* | 2/2016 | Klank | ...................... B62D 1/10 |
| | | | | 701/41 |
| 2020/0156543 | A1* | 5/2020 | Kubota | ...................... B60R 1/26 |
| 2023/0286569 | A1* | 9/2023 | Miyake | ................. B62D 5/001 |

FOREIGN PATENT DOCUMENTS

| EP | 2487651 | A1 | * | 8/2012 | ......... B62D 15/0275 |
| JP | 2003312525 | A | | 11/2003 | |
| JP | 2004338442 | A | | 12/2004 | |
| JP | 2006327421 | A | | 12/2006 | |
| JP | 2007118633 | A | | 5/2007 | |
| JP | 2008158671 | A | | 7/2008 | |
| JP | 2008278526 | A | | 11/2008 | |
| JP | 2014240205 | A | | 12/2014 | |
| JP | 2015016814 | A | | 1/2015 | |
| JP | 2015147547 | A | | 8/2015 | |
| JP | 2015160450 | A | | 9/2015 | |
| JP | 6277756 | B2 | * | 2/2018 | |
| KR | 101714517 | B1 | * | 3/2017 | |
| WO | 2014199877 | A1 | | 12/2014 | |
| WO | WO-2017043055 | A1 | * | 3/2017 | |

OTHER PUBLICATIONS

Office Action for Chinese Patent Application No. 202210163198.X dated Jul. 29, 2023; 13 pp.

* cited by examiner

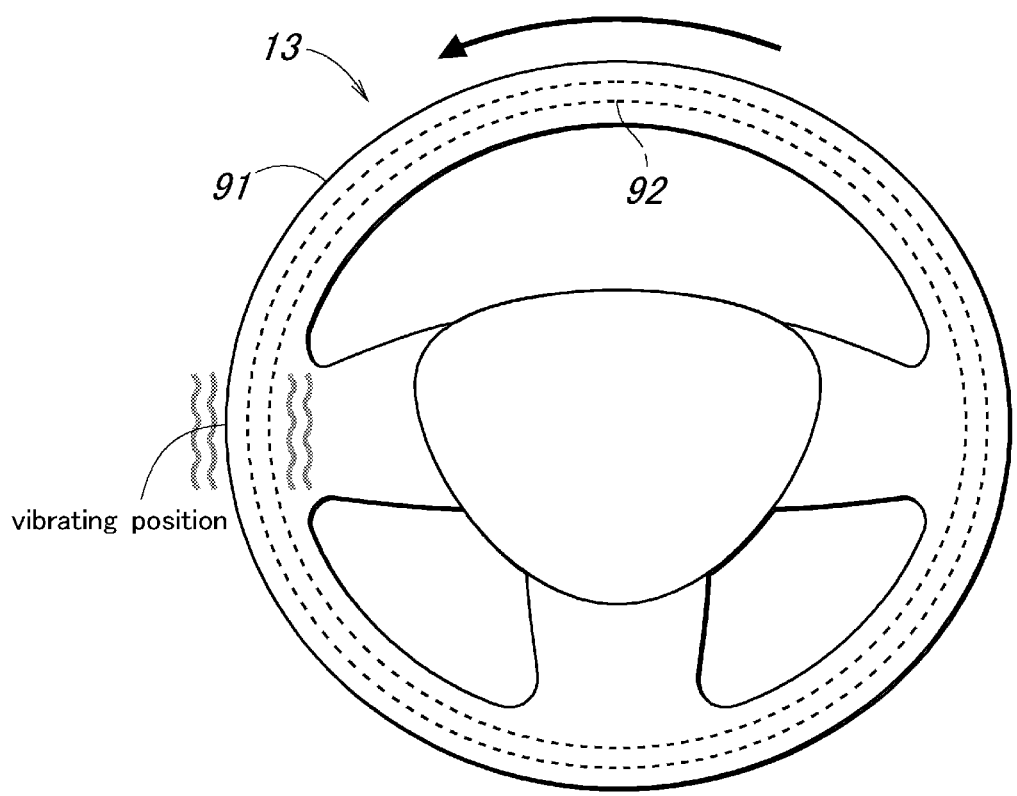

VEHICLE SYSTEM

TECHNICAL FIELD

The present invention relates to a vehicle system including a steer-by-wire steering device and a controller configured to control the steering device.

BACKGROUND ART

A steer-by-wire steering device is configured such that a steering wheel operated by a driver and a rack shaft that turns a wheel are mechanically separated, a steering angle sensor detects a steering angle of the steering wheel, and a turning actuator turns the wheel according to the steering angle.

On the other hand, in such a steer-by-wire steering device, when the driver moves the steering wheel in a state where a vehicle system is stopped, phase deviation may occur between the steering angle of the steering wheel and a turning angle of the wheel. If a vehicle starts in a state where the phase deviation occurs, the vehicle may start to move in a direction not intended by the driver. As such, phase matching for eliminating the phase deviation is performed in a state where the vehicle is stopped.

As a technique relating to phase matching in such a steer-by-wire steering device, a conventional technique is known (see JP2015-016814A). This conventional technique notifies a driver of an operation method of phase matching for eliminating phase deviation by a lighting state of LEDs provided on a steering wheel in a case where the phase deviation occurs between a steering angle and a turning angle.

In the abovementioned conventional technique, an LED closest to the top of the steering wheel is set to a reference LED, and an LED distanced from the reference LED in a lateral direction is lit according to a deviation angle between the steering angle and the turning angle. Accordingly, the driver can recognize an operation direction and an operation amount for eliminating the phase deviation.

On the other hand, when performing an operation for eliminating the phase deviation between the steering angle and the turning angle, the driver may have a desire to visually recognize an actual turning state of the wheel, namely, an actual direction in which the wheel faces. However, the conventional technique does not show any consideration to meet such a desire, so that the driver cannot visually recognize the actual turning state of the wheel.

SUMMARY OF THE INVENTION

In view of the above background, an object of the present invention is to provide a steer-by-wire steering device for a vehicle that enables a driver to visually recognize an actual turning state of a wheel when the driver performs an operation for eliminating phase deviation between a steering angle and a turning angle.

To achieve such an object, one aspect of the present invention provides a vehicle system (1), comprising: a steering device (11) including an operation member (steering wheel 13) configured to be operated by a driver, a turning member (rack shaft 12) mechanically separated from the operation member and configured to turn a wheel (4), a reaction force actuator (17) configured to apply a reaction force to the operation member, and a turning actuator (16) configured to drive the turning member; a controller (21) configured to perform control relating to the steering device; and a display device (31) configured to display information on the steering device, wherein the controller is configured to determine whether a steering angle of the operation member and a turning angle of the wheel are in a phase deviation state, and cause the display device to perform a guidance display and an actual state display in a case where the steering angle of the operation member and the turning angle of the wheel are in the phase deviation state, the guidance display prompting the driver to perform an operation for phase matching to improve the phase deviation state, the actual state display indicating an actual turning state of the wheel.

According to this aspect, the actual turning state of the wheel is displayed, so that the driver can visually recognize the actual turning state of the wheel. Accordingly, the driver can predict a travel direction of the vehicle based on the actual turning state of the wheel, and thus it is possible to prevent the vehicle from starting to move in a direction not intended by the driver.

In the above aspect, preferably, the controller is configured to cause the display device to display a first operation member image and a second operation member image in a superimposed state, the first operation member image indicating a current state of the operation member, the second operation member image indicating a target state of the phase matching.

According to this aspect, the driver can intuitively recognize the phase deviation state, namely, a state of deviation between a target steering angle and a current steering angle of the operation member. Further, the driver can easily recognize the target state of the operation member, and thus easily perform the operation for the phase matching on the operation member.

In the above aspect, preferably, the controller is configured to cause the display device to display a captured image as the actual state display, the captured image being captured by a camera configured to capture a lateral side of a vehicle body including the wheel.

According to this aspect, the driver can look at an actual state of the wheel included in the captured image, and thus more accurately recognize the turning state of the wheel.

In the above aspect, preferably, the display device is configured to display a captured image captured by a camera configured to capture a front of a vehicle body, and display a prospective trajectory line as the actual state display on the captured image, the prospective trajectory line indicating a travel direction of a vehicle.

According to this aspect, the driver can more accurately recognize the travel direction of an own vehicle by looking at the prospective trajectory line displayed on the captured image of the front of the own vehicle captured by the camera.

In the above aspect, preferably, the display device includes a plurality of light emitting portions (82) arranged in one direction, and the display device is configured to display both the turning angle and the steering angle as the actual state display by changing a light emitting state of the plurality of light emitting portions.

According to this aspect, the driver can immediately recognize the direction and magnitude of each of the turning angle and the steering angle and the phase deviation state between the turning angle and the steering angle. In this case, a light emitting portion indicating the turning angle may emit light in a prescribed exclusive color for the turning angle, and a light emitting portion indicating the steering angle may emit light in a prescribed exclusive color for the steering angle.

In the above aspect, preferably, in a case where the phase matching is completed, the controller causes the display device to perform a completion display indicating that the phase matching is completed.

According to this aspect, the driver can easily recognize that the phase matching is completed.

In the above aspect, preferably, in the phase deviation state, the controller controls the reaction force actuator such that the reaction force applied to the operation member acts as a frictional reaction force that does not apply a restoring force to the operation member, and when the phase matching is completed, the controller controls the reaction force actuator so as to reduce the reaction force applied to the operation member.

According to this aspect, it is possible to prevent the operation member from automatically moving toward a target position during the phase matching. Further, the driver can easily recognize by a bodily sensation that the phase matching is completed.

In the above aspect, preferably, the controller is configured to acquire information on an output state of the turning actuator, acquire information on the phase deviation state, determine whether the phase deviation state can be improved within a prescribed period by a driving force of the turning actuator based on the information on the output state and the information on the phase deviation state, and cause the display device to perform the guidance display and the actual state display upon determining that the phase deviation state cannot be improved within the prescribed period.

According to this aspect, the phase matching can be performed according to the driver's operation and thus the phase deviation state can be surely eliminated in a case where the driving force of the turning actuator is insufficient and thus the phase matching cannot be performed by the driving force of the turning actuator.

In the above aspect, preferably, the display device is provided in the operation member, and the controller is configured to control the operation member so as to keep a screen direction constant even when the operation member rotates, the screen direction being a direction of a screen (phase matching guidance screen 53) displayed on the display device.

According to this aspect, the display device is provided in the operation member, so that the driver can more intuitively recognize not only the fact that the phase matching is required due to the occurrence of the phase deviation but also the operation method for the phase matching on the operation member. Further, the display of the display device does not rotate even if the operation member rotates, so that the driver can look at the display of the display device without any trouble.

In the above aspect, preferably, the operation member includes a vibrating portion (92) arranged at least on each of left and right sides of a center of the operation member, and in the phase deviation state, the controller vibrates the vibrating portion at a position corresponding to an operation direction of the operation member for the phase matching.

According to this aspect, the driver can easily recognize by a bodily sensation not only the fact that the phase matching is required due to the occurrence of the phase deviation but also the operation direction of the operation member for the phase matching.

Thus, according to the above aspects, the actual turning state of the wheel is displayed, so that the driver can visually recognize the actual turning state of the wheel. Accordingly, the driver can predict a travel direction of the vehicle based on the actual turning state of the wheel, and thus it is possible to prevent the vehicle from starting to move in a direction not intended by the driver.

BRIEF DESCRIPTION OF THE DRAWING(S)

FIG. 11 is a front view of a steering wheel according to a fifth embodiment.

DETAILED DESCRIPTION OF THE INVENTION

Hereinafter, embodiments of the present invention will be described in detail with reference to the drawings.

The First Embodiment

Figure 1:
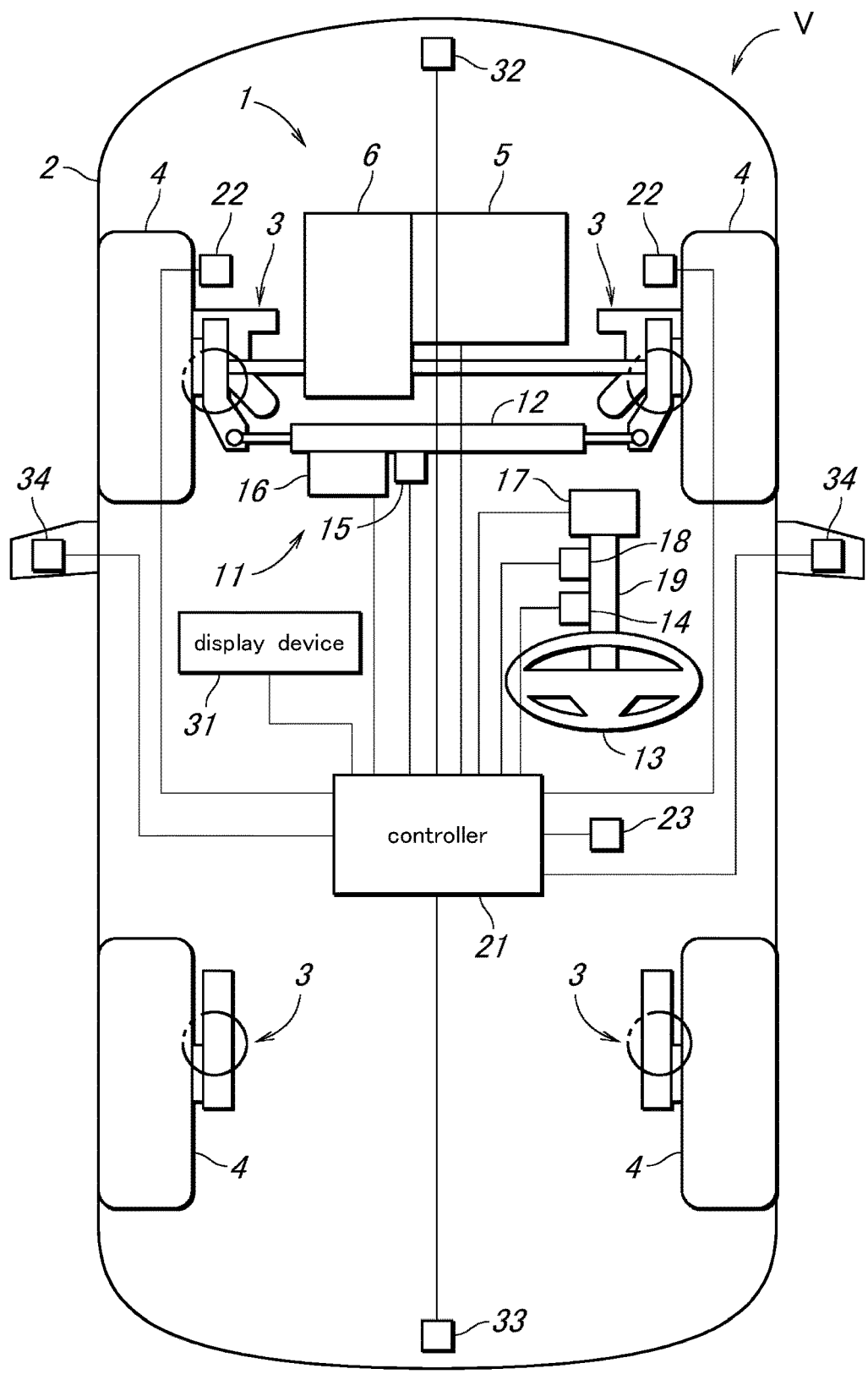
FIG. 1 is a schematic block diagram of a vehicle on which a steering device according to a first embodiment is mounted.

FIG. 1 is a schematic block diagram of a vehicle (see "V" in FIG. 1) provided with a vehicle system 1 according to a first embodiment. As shown in FIG. 1, the vehicle is a four-wheeled automobile including four wheels 4 supported by a vehicle body 2 via suspensions 3.

The vehicle system 1 includes a power plant 5 (a driving device for causing the vehicle to travel) that drives the wheels 4 and a transmission 6 (transmission device) that changes a transmission mode of a driving force from the power plant 5 to the wheels 4. The power plant 5 consists of at least one of an internal combustion engine and an electric motor, and the driving force and a braking force (engine braking) of the power plant 5 are transmitted to the wheels 4. The power plant 5 is controlled according to an accelerator operation by a driver. Further, the transmission 6 is controlled according to a shift operation by the driver.

Further, the vehicle system 1 includes a steer-by-wire steering device 11 that turns the wheels 4 (for example, front wheels 4). The steering device 11 includes a rack shaft 12 (turning member), a steering wheel 13 (operation member), a steering angle sensor 14, a turning angle sensor 15, a turning actuator 16 (turning device), a reaction force actuator 17 (reaction force device), and a steering torque sensor 18. Incidentally, the steering device 11 consists of the so-called shaftless steer-by-wire steering device in which the rack shaft 12 and the steering wheel 13 are not mechanically connected.

The steering wheel 13 is operated by the driver. The steering angle sensor 14 detects a steering angle (steering wheel angle) of the steering wheel 13. The turning angle sensor 15 detects a turning angle (wheel angle) of the wheels 4 (for example, the front wheels 4). The turning actuator 16 drives the rack shaft 12 by pushing or pulling the rack shaft 12, thereby turning the wheels 4. The reaction force actuator 17 applies to the steering wheel 13 a reaction force to an operation by the driver. The steering torque sensor 18 detects steering torque applied to the steering shaft 19.

Further, the vehicle system 1 includes a controller 21 (Electronic Control Unit: ECU), a vehicle speed sensor 22 (a driving condition detecting unit and a vehicle speed detecting unit), and an acceleration sensor 23. The controller 21 consists of a processor, memory, and the like, and controls the turning actuator 16 and the reaction force actuator 17 based on detection results of sensors such as the steering angle sensor 14, the turning angle sensor 15, the steering torque sensor 18, the vehicle speed sensor 22, and the acceleration sensor 23.

Further, the vehicle system 1 includes a display device 31. The display device 31 consists of a display of a navigation device or the like that has a display function by a liquid crystal display panel or the like.

Further, the vehicle system 1 includes a front camera 32, a rear camera 33, and left and right side cameras 34. The front camera 32 captures the front of the vehicle body 2. The rear camera 33 captures the rear of the vehicle body 2. The side cameras 34 capture the lateral sides of the vehicle body 2.

In the vehicle system 1 having such a configuration, when the driver moves the steering wheel 13 in a state where the vehicle system 1 is stopped, phase deviation, which is a state where the steering angle (steering wheel angle) of the steering wheel 13 the turning angle (wheel angle) of the wheels 4 do not match, may occur. If the vehicle starts in a state where the phase deviation occurs, the vehicle may start to move in a direction not intended by the driver. As such, phase matching for eliminating the phase deviation is performed in a state where the vehicle is stopped. Incidentally, "a state where the turning angle and the steering angle match" means a state where a prescribed relationship between the turning angle and the steering angle is maintained.

Figure 2A:
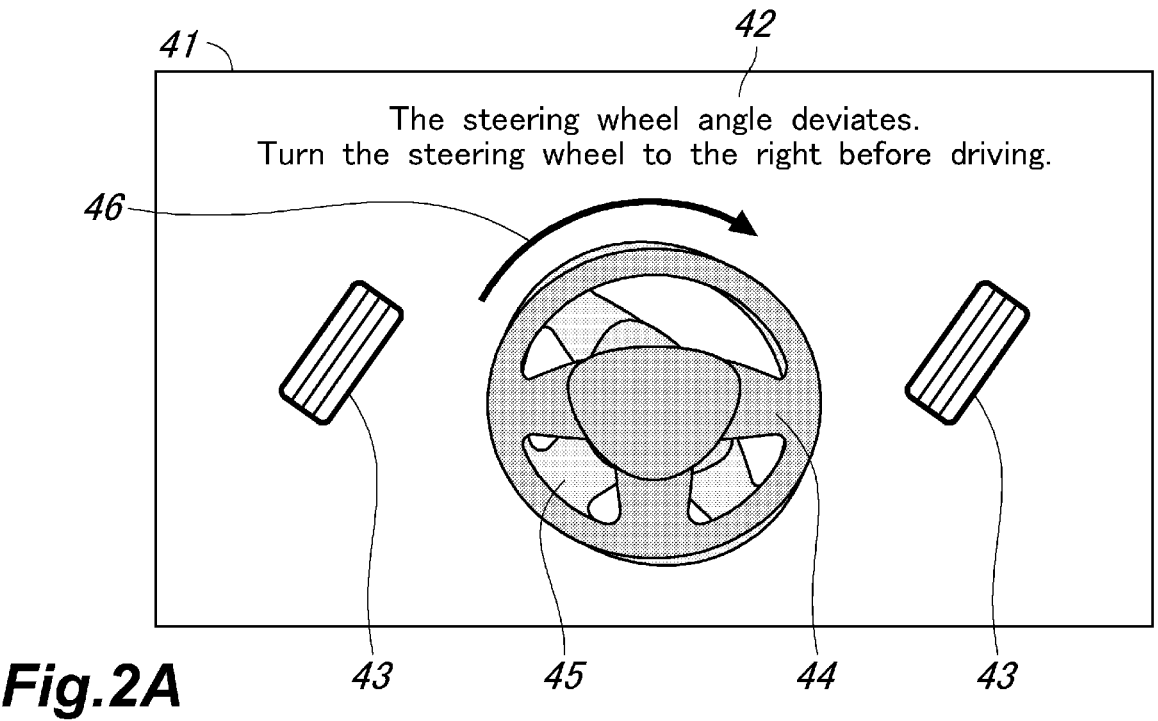
FIG. 2A is a diagram showing a guidance screen for phase matching displayed on a display device according to the first embodiment.
Figure 2B:
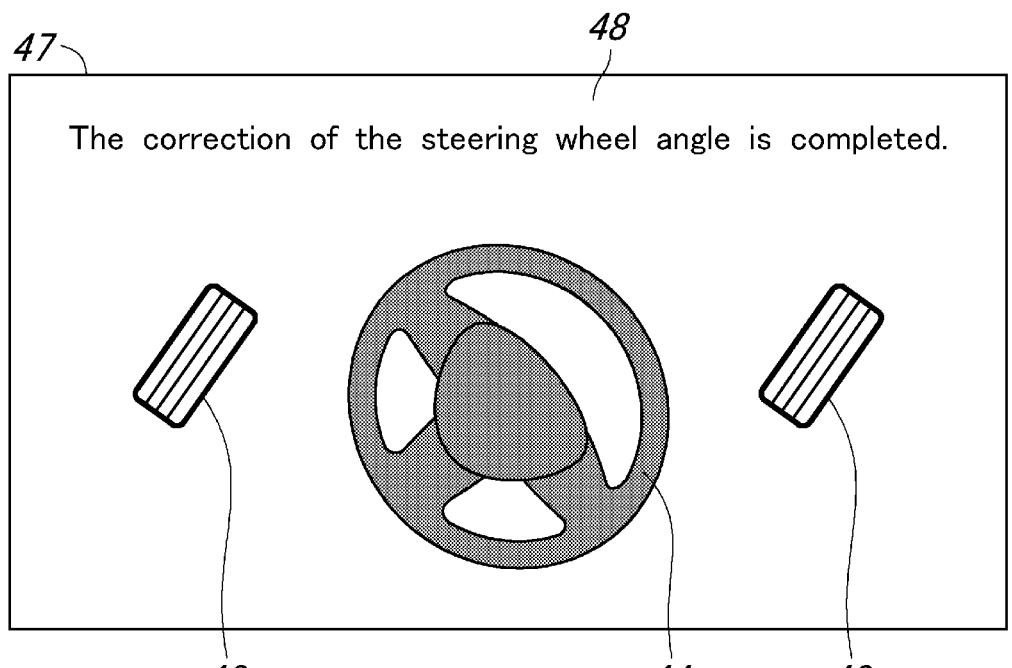
FIG. 2B is a diagram showing a completion screen for phase matching displayed on a display device according to the first embodiment.

Next, screens for the phase matching displayed on the display device 31 according to the first embodiment will be described. FIGS. 2A and 2B are diagrams each showing the screen for the phase matching. FIG. 2A shows a phase matching guidance screen 41, and FIG. 2B shows a phase matching completion screen 47.

In the present embodiment, when the phase deviation, which is a state where the steering angle of the steering wheel 13 and the turning angle of the wheels 4 do not match, is detected and it is determined that the phase matching by the driver's operation is required, the phase matching guidance screen 41 shown in FIG. 2A is displayed. At this time, the control to prohibit the vehicle from starting is performed by using a shift lock or the like that disables a shift operation of the transmission 6.

On the phase matching guidance screen 41, guidance characters 42 are displayed as a guidance display that notifies the driver of the occurrence of the phase deviation and prompts the driver to perform an operation for the phase matching (hereinafter referred to as "phase matching operation") to improve (eliminate) the phase deviation state. Accordingly, the driver can easily recognize that the phase matching is required due to the occurrence of the phase deviation.

Further, on the phase matching guidance screen 41, wheel images 43 are displayed as an actual state display that indicates an actual turning state of the wheels 4. Accordingly, the driver can recognize the actual turning state of the wheels 4.

Further, on the phase matching guidance screen 41, a first operation member image 44 and a second operation member image 45 are displayed in a superimposed state. The first operation member image 44 indicates a current state of the steering wheel 13 (operation member), and the second operation member image 45 indicates a target state of the steering wheel 13 where the steering angle matches the turning angle of the wheels 4 (namely, a target state of the phase matching). More specifically, for example, the first operation member image 44 may be displayed on a foreground side, and the second operation member image 45 may be displayed on a background side of the first operation member image 44. Further, the first operation member image 44 on the foreground side may be displayed in a transparent state. Accordingly, the driver can intuitively recognize the phase deviation state, namely, the difference between a target steering angle and a current steering angle of the steering wheel 13. Further, the driver can easily recognize the target state of the steering wheel 13, and thus easily perform the phase matching operation on the steering wheel 13.

Further, on the phase matching guidance screen 41, an arrow image 46, which indicates an operation direction of the phase matching operation on the steering wheel 13, is displayed. Accordingly, the driver can easily recognize the operation direction of the steering wheel 13 for the phase matching.

When the driver operates the steering wheel 13 according to the display of the phase matching guidance screen 41 and thus the phase matching is completed, the phase matching completion screen 47 shown in FIG. 2B is displayed.

On the phase matching completion screen 47, guidance characters 48, such as "The phase matching is completed." ("The correction of the steering wheel angle is completed."), are displayed as a completion display that indicates that the phase matching is completed. Further, on the phase matching completion screen 47, the first operation member image 44 that indicates a current state of the steering wheel 13 is displayed. The first operation member image 44 displayed on the phase matching completion screen 47 has a color different from the color of the first operation member image 44 displayed on the phase matching guidance screen 41 shown in FIG. 2A. For example, the first operation member image 44, which has been displayed in gray on the phase matching guidance screen 41 changes to blue on the phase matching completion screen 47. Accordingly, the driver can easily recognize the completion of the phase matching.

When the prescribed period has elapsed since the completion of the phase matching, the screen of the display device 31 turns off. At this time, the control to release the prohibition of the start (hereinafter referred to as "the start prohibition") of the vehicle is performed.

Incidentally, the display device 31 on which the phase matching guidance screen 41 and the phase matching completion screen 47 according to the present embodiment are displayed may consist of the display of the navigation device, a display of a meter panel, a head-up display, or the like.

Figure 3A:
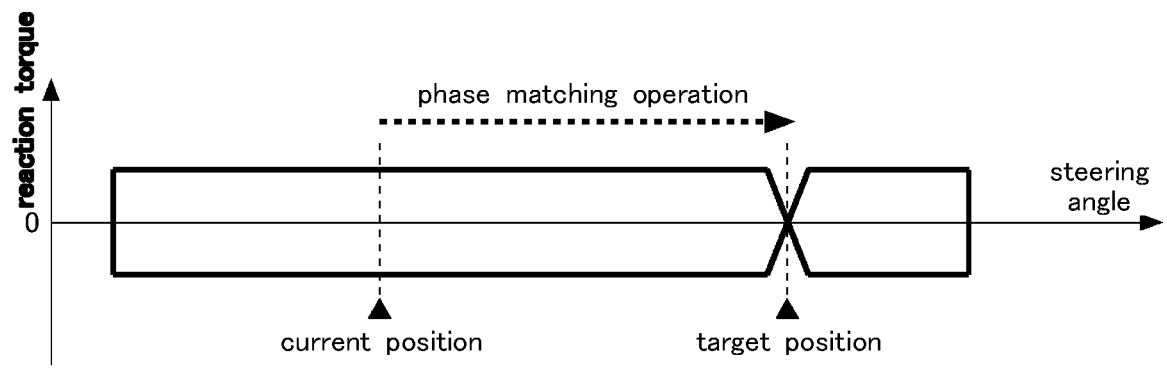
FIG. 3A is a graph showing a reaction force characteristic of a reaction force actuator according to the first embodiment.
Figure 3B:
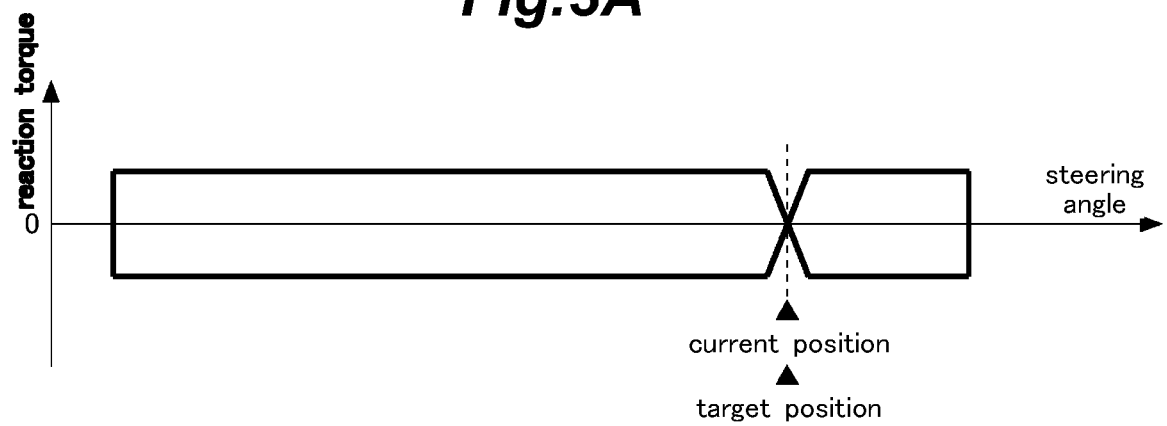
FIG. 3B is a graph showing a reaction force characteristic of a reaction force actuator according to the first embodiment.
Figure 3C:
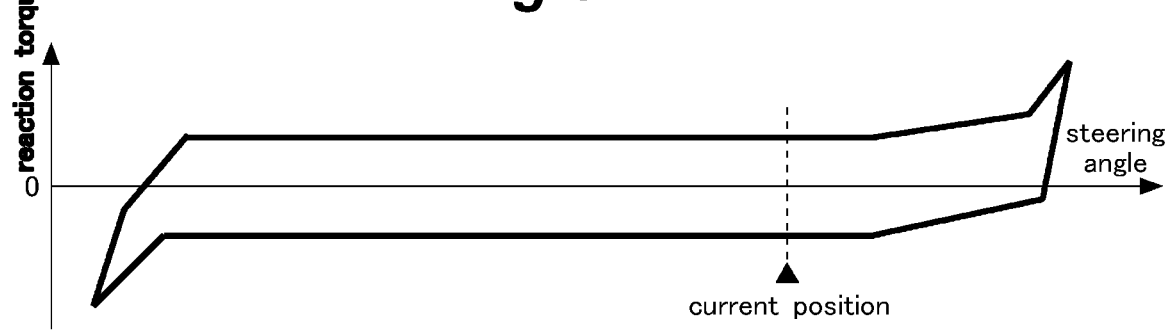
FIG. 3C is a graph showing a reaction force characteristic of a reaction force actuator according to the first embodiment.

Next, reaction force control performed by the controller 21 according to the first embodiment will be described. FIGS. 3A to 3C are graphs each showing a reaction force characteristic of the reaction force actuator 17. FIG. 3A shows a state during the phase matching, FIG. 3B shows a state at the completion of the phase matching, and FIG. 3C shows the state after the completion of the phase matching. In FIGS. 3A to 3C, the horizontal axis of the graph indicates the steering angle of the steering wheel 13, and the vertical axis of the graph indicates the reaction torque applied by the reaction force actuator 17.

The controller 21 controls the reaction torque applied to the steering wheel 13 by using the reaction force actuator 17 according to the steering angle of the steering wheel 13.

FIG. 3A shows a state during the phase matching. In FIG. 3A, a current position of the steering wheel 13 deviates from a target position (a position where the turning angle and the steering angle match, namely, a position where the phase matching is completed) of the steering wheel 13. In this state, the reaction force actuator 17 applies constant reaction torque to the steering wheel 13. At this time, the controller 21 controls the reaction force actuator 17 such that the reaction force applied by the reaction force actuator 17 acts as a frictional reaction force that does not apply a restoring force to the steering wheel 13 (that does not restore the steering wheel 13 to the target position). Accordingly, it is possible to prevent the steering wheel 13 from automatically moving toward the target position.

On the other hand, as shown in FIG. 3B, in a state where the current position of the steering wheel 13 and the target position of the steering wheel 13 match and thus the phase matching is completed, the reaction torque applied by the reaction force actuator 17 becomes zero. Accordingly, the driver can easily recognize by a bodily sensation (by a click feeling) that the phase matching is completed. In this state, the reaction torque applied to the steering wheel 13 does not necessarily become zero as far as the reaction torque is reduced.

Further, as shown in FIG. 3C, when the prescribed period has elapsed after the phase matching is completed, the reaction force characteristic of the steering wheel 13 switches to normal (a reaction force characteristic for turning the steering wheel 13 in a state where the vehicle is stopped).

Figure 4:
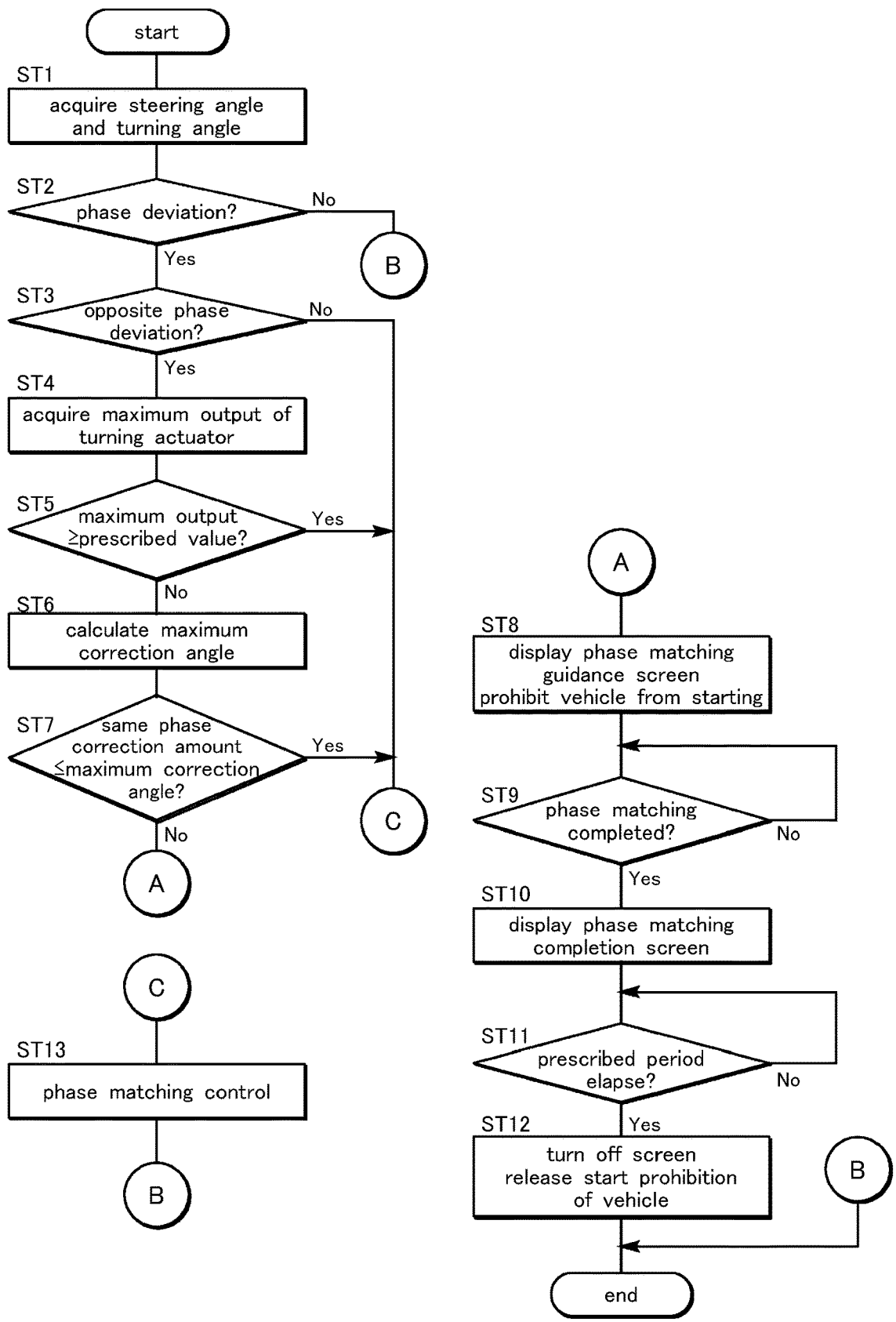
FIG. 4 is a flowchart showing the operation procedure of a controller according to the first embodiment.

Next, the operation procedure of the controller 21 according to the first embodiment will be described. FIG. 4 is a flowchart showing the operation procedure of the controller 21.

Upon starting up, the controller 21 first acquires the steering angle of the steering wheel 13 and the turning angle of the wheels 4 (step ST1), and determines whether the phase deviation between the steering angle and the turning angle occurs, that is, whether a mismatching state where the phases of the steering angle and the turning angle do not match occurs (step ST2).

In a case where the phase deviation between the steering angle and the turning angle occurs (step ST2: Yes), the controller 21 determines whether the type of the phase deviation is opposite phase deviation (step ST3).

In a case where the type of the phase deviation is the opposite phase deviation (step ST3: Yes), the controller 21 acquires the maximum output (output state) of the turning actuator 16 (step ST4). Then, the controller 21 determines whether the maximum output is equal to or more than a prescribed value (step ST5). Incidentally, the maximum output of the turning actuator 16 may be detected by an appropriate sensor, or may be estimated based on a detection result of the appropriate sensor. Further, the prescribed value is a value at which the wheels 4 can be turned at a prescribed speed in a state where the vehicle is stopped.

In a case where the maximum output of the turning actuator 16 is less than the prescribed value (step ST5: No), the controller 21 calculates a maximum correction angle (namely, the maxim changing amount of the turning angle within a prescribed period in a state where the vehicle is stopped) based on the maximum output of the turning actuator 16 (step ST6).

Next, the controller 21 calculates a same phase correction amount, namely, a correction amount required to match the phase of the turning angle and the phase of the steering angle. Then, the controller 21 determines whether the same phase correction amount is equal to or smaller than the maximum correction angle, that is, whether the phase deviation between the steering angle and the turning angle can be improved (eliminated) within a prescribed period (step ST7). Incidentally, "to improve (eliminate) the phase deviation state" means "to match the phase of the turning angle and the phase of the steering angle, which have been fallen into the opposite phase deviation", that is, "to match the travel direction predicted by the driver and the actual travel direction of the vehicle".

In a case where the same phase correction amount is larger than the maximum correction angle (step ST7: No), the controller 21 determines that manual phase matching by the driver's operation is required, and causes the display device 31 to display the phase matching guidance screen 41 (see FIG. 2A) and perform the control to prohibit the vehicle from starting by using the shift lock or the like (step ST8). On the phase matching guidance screen 41, not only the phase deviation state but also characters prompting the driver to perform the phase matching operation are displayed.

Next, the controller 21 determines whether the phase matching is completed, that is, whether the turning angle and the steering angle match (step ST9). In a case where the phase matching is completed (step ST9: Yes), the controller 21 causes the display device 31 to display the phase matching completion screen 47 (see FIG. 2B) (step ST10). On the phase matching completion screen 47, not only a state where the phase matching is completed but also characters notifying the driver that the phase matching is completed are displayed.

Next, the controller 21 determines whether a prescribed period has elapsed since the completion of the phase matching (step ST11). In a case where the prescribed period has elapsed since the completion of the phase matching (step ST11: Yes), the controller 21 turns off the screen of the display device 31 and performs the control to release the start prohibition of the vehicle (step ST12).

By the way, in a case where the phase deviation between the steering angle and the turning angle does not occur (step ST2: No), the controller 21 ends the present process.

Further, in a case where the type of the phase deviation is not the opposite phase deviation (step ST3: No), in a case where the maximum output of the turning actuator 16 is equal to or more than the prescribed value (step ST5: Yes), or in a case where the same phase correction amount is equal to or less than the maximum correction angle (step ST7: Yes), the controller 21 performs phase matching control (step ST13). In the phase matching control, the phase matching is performed by using the driving force of the turning actuator 16. Incidentally, the phase matching control may be executed by driving the reaction force actuator 17.

In this way, in the present embodiment, in a state where the vehicle is stopped, the phase deviation between the steering angle and the turning angle is detected, the phase deviation state is displayed, and the driver is prompted to perform the phase matching operation to improve (eliminate) the phase deviation. Accordingly, when the vehicle starts, it is possible to prevent the vehicle from moving in a direction not intended by the driver due to the phase deviation.

Further, in a case where the phase matching can be performed by the driving force of the turning actuator 16, the screen for the phase matching is not displayed on the display device 31, and thus it is possible to prevent the driver from feeling annoyed. Further, in the phase deviation state before the completion of the phase matching, the vehicle is prohibited from starting by using the shift lock or the like, and thus it is possible to prevent the driver from starting the vehicle without noticing the display of the screen for the phase matching.

Further, the phase matching completion screen is displayed until the prescribed period elapses after the phase matching is completed. Accordingly, the driver can recognize that the phase matching is completed. Further, when the prescribed period elapses after the phase matching is completed, the screen of the display device 31 turns off. Accordingly, it is possible to eliminate the annoyance felt by the driver when the screen is always displayed during driving.

Further, in the present embodiment, the information on the output state of the turning actuator 16 is acquired, and the screen for the phase matching is not displayed in a case where the phase matching can be performed by the driving force of the turning actuator 16. Accordingly, it is possible to eliminate the annoyance felt by the driver due to a useless screen display by the display device 31.

In an example shown in FIG. 4, in a case where the opposite phase deviation occurs and the driving force of the turning actuator 16 is insufficient, the screen for the phase matching is displayed on the display device 31 so that the driver can manually perform the phase matching. More specifically, in a state (degraded state) where the output of the turning actuator 16 is limited due to an excessive temperature rise of the turning actuator 16 or the like, the phase matching from the opposite phase deviation cannot be performed by the driving force of the turning actuator 16 since the driving force of the turning actuator 16 is insufficient. In such a case, the driver manually performs the phase matching.

Figure 5:
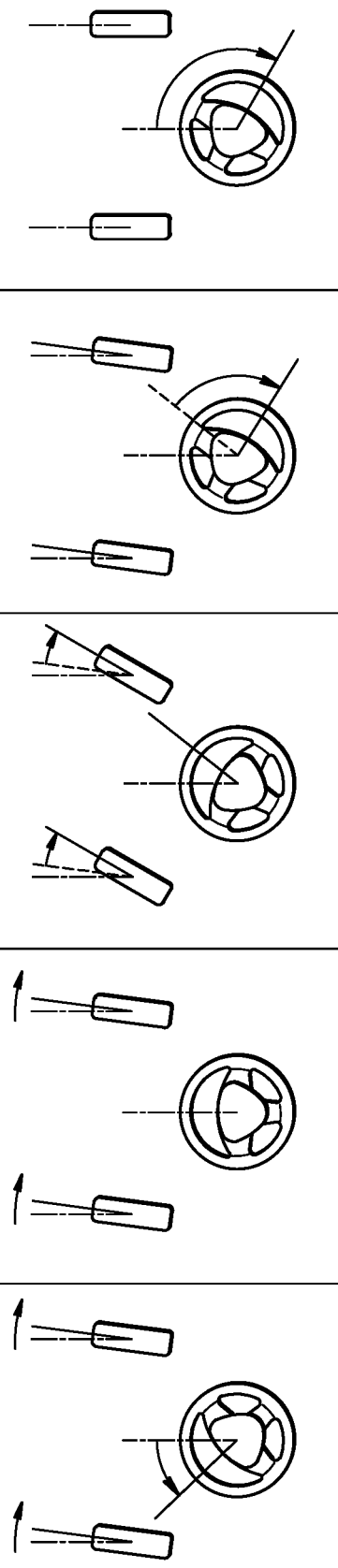
FIG. 5 is a diagram showing the relationship between a steering angle of a steering wheel and a turning angle of wheels.
Figure 6:
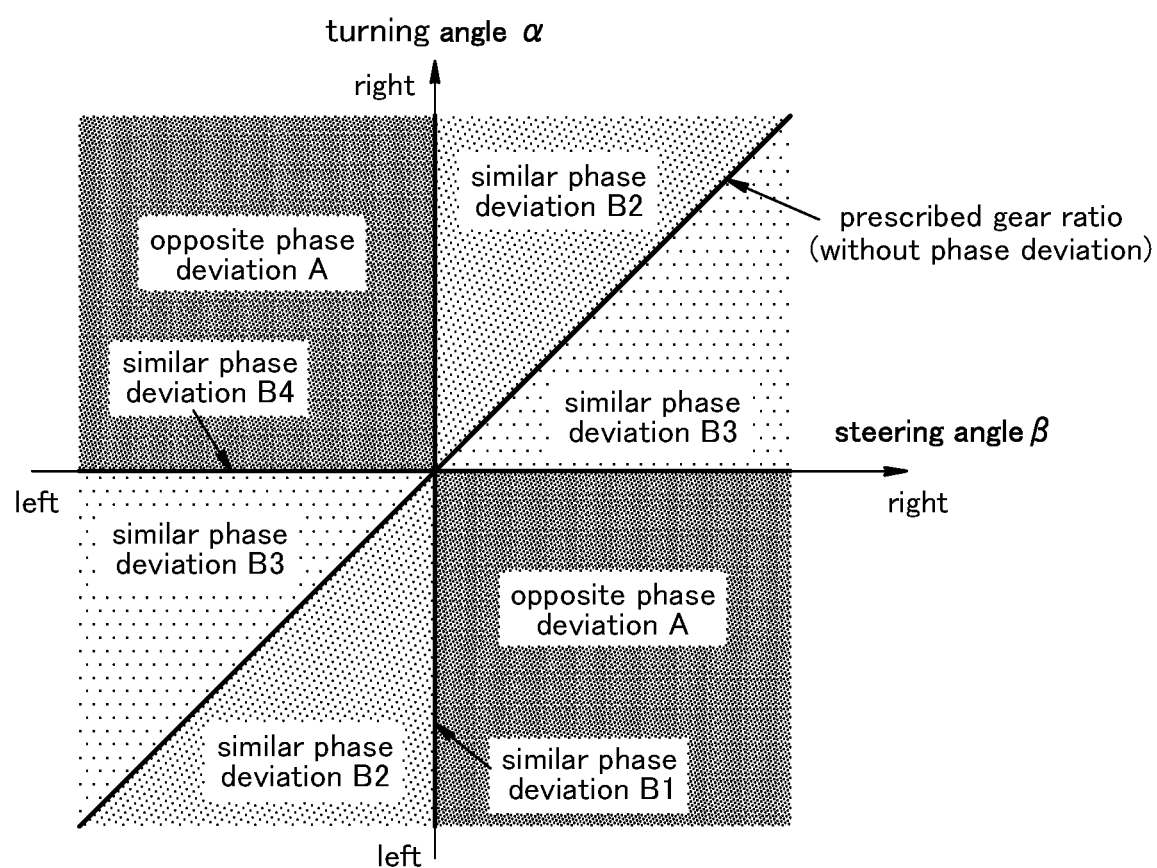
FIG. 6 is a graph showing the relationship between the steering angle of the steering wheel and the turning angle of the wheels.

Next, the type of the phase deviation will be described. FIG. 5 is a diagram showing the relationship between the steering angle of the steering wheel 13 and the turning angle of the wheels 4. FIG. 6 is a graph showing the relationship between the steering angle of the steering wheel 13 and the turning angle of the wheels 4.

As shown in FIG. 5, the type of the phase deviation (mismatching state) of the steering angle and the turning angle can be classified into opposite phase deviation (see "A" in FIG. 5) in which the phases of the steering angle and the turning angle are arranged in directions opposite to each other and a similar phase deviation (see "B1" to "B4" in FIG. 5) in which the phases of the steering angle the turning angle are arranged in directions similar to each other. Incidentally, in a case where only one of the phases of the steering angle and the turning angle is zero or in a prescribed angle range to be regarded as zero (hereinafter, simply referred to as "in a case where the phase is zero"), the type of the phase deviation (mismatching state) is classified as the similar phase deviation. Accordingly, the similar phase deviation includes four types of B1 to B4. In the type B1, the steering angle is zero and the turning angle is not zero (shifted to the right side or the left side). In the type B2, the phase of the turning angle is larger than the phase of the steering angle. In the type B3, the phase of the turning angle is smaller than the phase of the steering angle. In the type B4, the turning angle is zero and the steering angle is not zero (shifted to the right side or the left side).

Further, in FIG. 6, one type of the opposite phase deviation and four types of the similar phase deviation are shown in a graph. In the determination as to whether the phase deviation (phase shift) of the steering angle and the turning angle occurs in step ST2 of FIG. 4, whether the phase relationship between the steering angle and the turning angle changes from a prescribed gear ratio (whether the phase relationship therebetween deviates from a gear ratio line shown diagonally in FIG. 6) is determined.

The Modification of the First Embodiment

Figure 7:
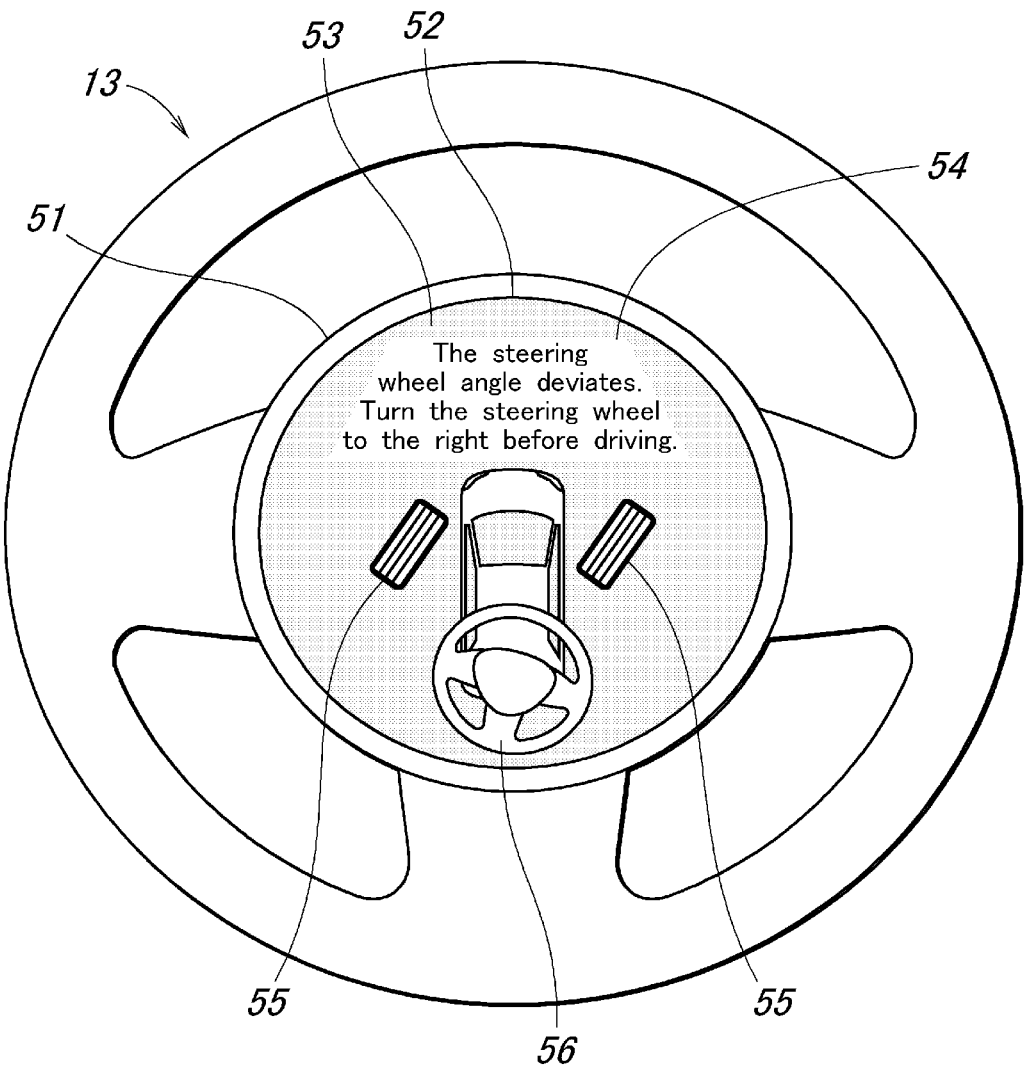
FIG. 7 is a front view of a steering wheel according to a modification of the first embodiment.

Next, a modification of the first embodiment will be described. The contents that will not be specifically mentioned below are the same as those of the abovementioned embodiment. FIG. 7 is a front view of a steering wheel 13 according to the modification of the first embodiment.

In this modification, in a central portion 51 (hub portion) of the steering wheel 13, a display device 52 is provided. On the display device 52, a phase matching guidance screen 53 is displayed.

On the phase matching guidance screen 53, guidance characters 54 are displayed as a guidance display that notifies the driver of the occurrence of the phase deviation and prompts the driver to perform the phase matching operation to improve the phase deviation state.

Further, on the phase matching guidance screen 53, wheel images 55 are displayed as an actual state display indicating an actual turning state of the wheels 4.

Further, on the phase matching guidance screen 53, an operation member image 56 that indicates a target state of the steering wheel 13 where the steering angle matches the turning angle of the wheels 4 is displayed.

Thus, in this modification, the phase matching guidance screen 53 is displayed on the central portion 51 of the steering wheel 13, so that the driver can more intuitively recognize not only the fact that the phase matching is required due to the occurrence of the phase deviation but also an operation method of the steering wheel 13 for the phase matching.

Further, the controller 21 controls the steering wheel 13 so as to keep a screen direction (a direction of the displayed phase matching guidance screen 53) constant even when the steering wheel 13 rotates. That is, the steering wheel 13 is controlled such that the top and bottom of the phase matching guidance screen 53 always face the up-and-down direction. Accordingly, even if the steering wheel 13 is rotated, the driver can look at the phase matching guidance screen 53 without any trouble.

The Second Embodiment

Figure 8:
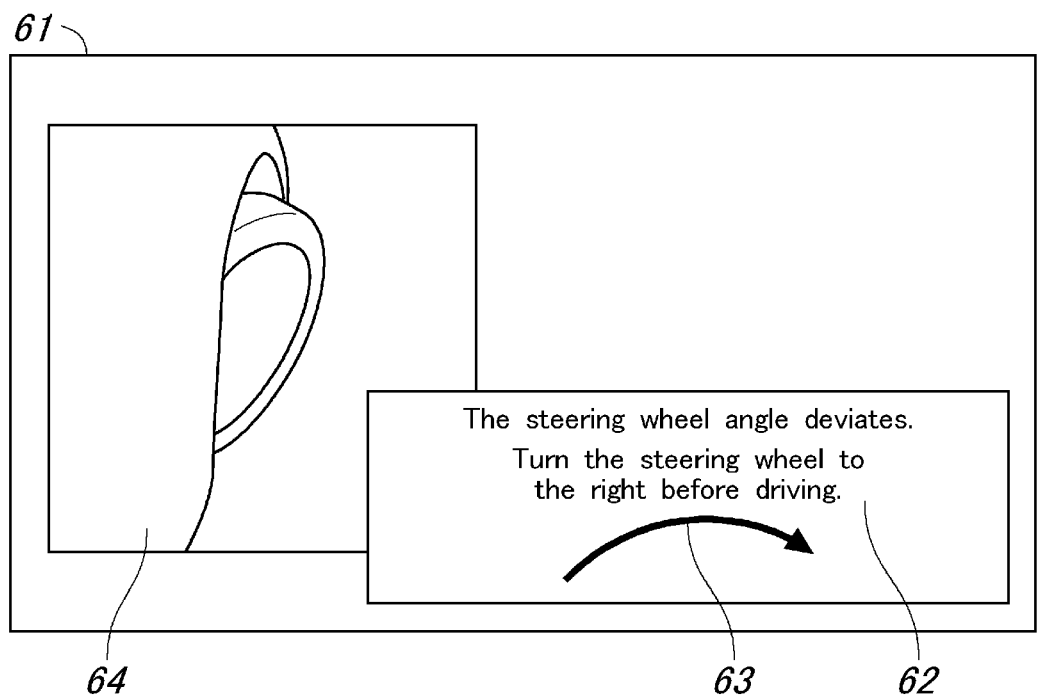
FIG. 8 is a diagram showing a phase matching guidance screen displayed on a display device according to a second embodiment.

Next, a second embodiment will be described. The contents that will not be specifically mentioned below are the same as those of the abovementioned embodiments. FIG. 8 is a diagram showing a phase matching guidance screen 61 displayed on a display device 31 according to the second embodiment.

In the present embodiment, when the phase deviation is detected, the phase matching guidance screen 61 shown in FIG. 8 is displayed on the display device 31.

On the phase matching guidance screen 61, guidance characters 62 are displayed as a guidance display that notifies the driver of the occurrence of the phase deviation and prompts the driver to perform the phase matching operation to improve the phase deviation state. Also, on the phase matching guidance screen 61, an arrow image 63 that indicates the operation direction of the steering wheel 13 for the phase matching is displayed. Accordingly, the driver can easily recognize not only the fact that the phase matching is required due to the occurrence of the phase deviation but also the operation direction of the steering wheel 13 for the phase matching.

Further, on the phase matching guidance screen 61, a captured image 64, which is captured by the side camera 34 configured to capture a lateral side of the vehicle body 2 is displayed as an actual state display indicating the actual turning state of the wheels 4. On the captured image 64, an image of the wheel 4 (for example, one of the front wheels) of the own vehicle is displayed. Accordingly, the driver can more accurately recognize the turning state of the wheels 4 of the own vehicle by looking at the captured image 64.

Incidentally, an area including the wheel 4 (one of the front wheels), which has been cut out from an around view, may be displayed. The around view may be generated by compositing captured images captured by the front camera 32, the rear camera 33, and the side cameras 34, which are provided on a front side, rear side, and both lateral sides of the vehicle body 2 respectively.

Incidentally, the display device 31 on which the phase matching guidance screen 61 according to the present embodiment is displayed may consist of a display of a navigation device, a display of a meter panel, a head-up display, or the like.

The Third Embodiment

Figure 9:
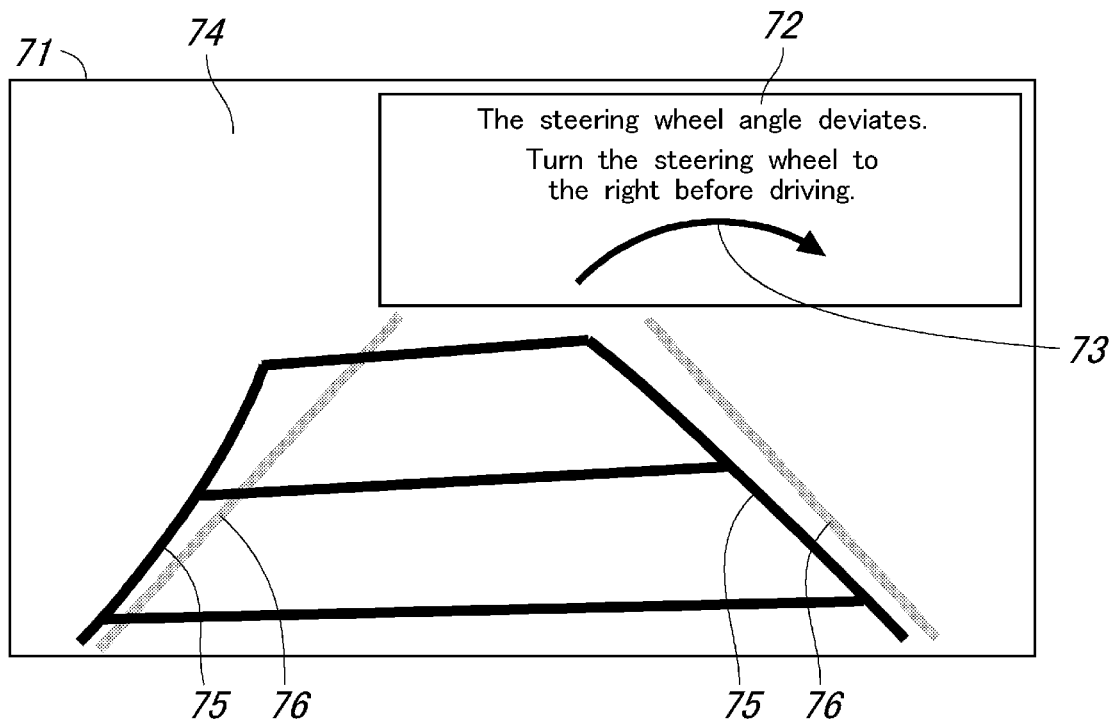
FIG. 9 is a diagram showing a phase matching guidance screen displayed on a display device according to a third embodiment.

Next, a third embodiment will be described. The contents that will not be specifically mentioned below are the same as those of the abovementioned embodiments. FIG. 9 is a diagram showing a phase matching guidance screen 71 displayed on a display device 31 according to the third embodiment.

In the present embodiment, when the phase deviation is detected, the phase matching guidance screen 71 shown in FIG. 9 is displayed on the display device 31.

On the phase matching guidance screen 71, guidance characters 72 are displayed as a guidance display that notifies the driver of the occurrence of the phase deviation and prompts the driver to perform the phase matching operation to improve the phase deviation state. Also, on the phase matching guidance screen 71, an arrow image 73 that indicates the operation direction of the steering wheel 13 for the phase matching is displayed. Accordingly, the driver can easily recognize not only the fact that the phase matching is required due to the occurrence of the phase deviation but also the operation direction of the steering wheel 13 for the phase matching.

Further, on the phase matching guidance screen 71, a captured image 74 captured by the front camera 32 configured to capture the front of the vehicle body 2 is displayed. On the captured image 74, a prospective trajectory line 75 and a vehicle width extension line 76 are displayed as the actual state display indicating the actual turning state of the wheel 4. The prospective trajectory line 75 indicates the travel direction of the vehicle according to the actual turning angle of the wheels 4. Further, the vehicle width extension line 76 acts as a guide of the travel direction in a case where the vehicle travels straight. The driver can easily recognize the exact travel direction of the own vehicle by comparing the prospective trajectory line 75 with the vehicle width extension line 76.

Incidentally, in a case where the transmission 6 is in a drive position (D range), the captured image of the front of the own vehicle captured by the front camera 32 and the prospective trajectory line 75 may be displayed. Further, in a case where the transmission 6 is in a reverse position (R range), the captured image of the rear of the own vehicle captured by the rear camera 33 and the prospective trajectory line 75 may be displayed.

Incidentally, the display device 31 on which the phase matching guidance screen 71 according to the present embodiment is displayed may consist of a display of a navigation device or a display of a room mirror type, a head-up display, or the like.

The Fourth Embodiment

Figure 10A:
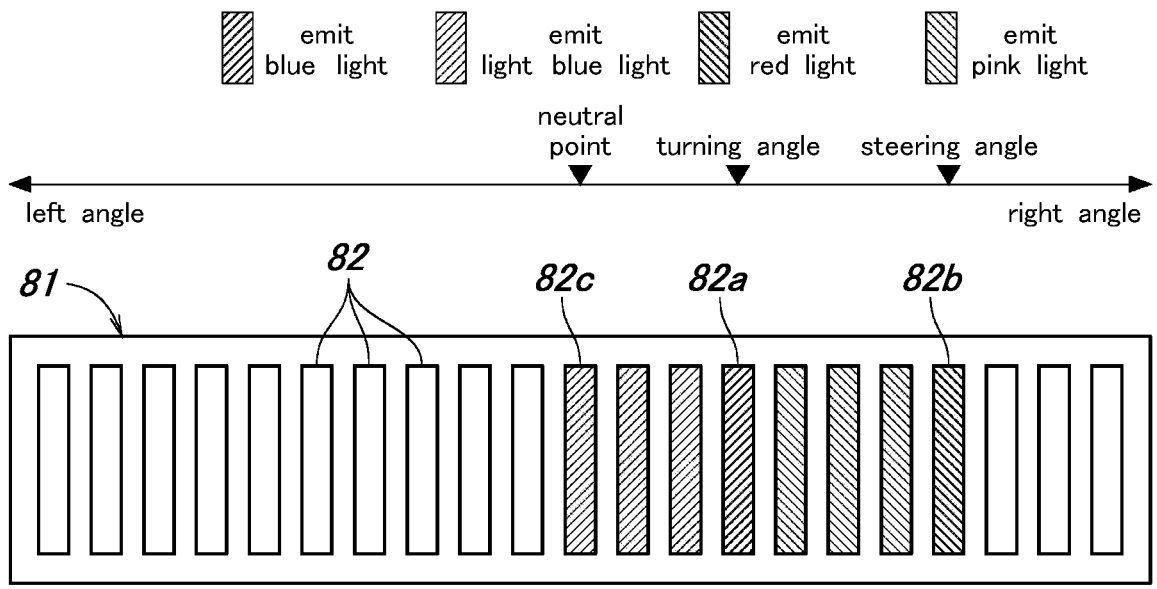
FIG. 10A is a front view showing a display device according to a fourth embodiment.
Figure 10B:
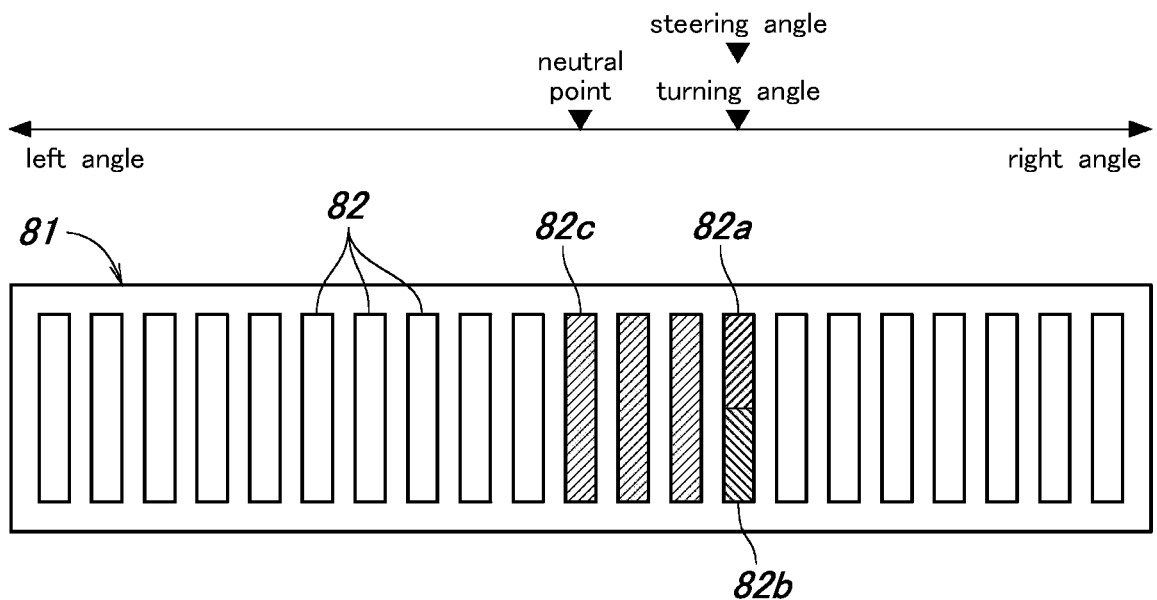
FIG. 10B is a front view showing the display device according to the fourth embodiment.

Next, a fourth embodiment will be described. The contents that will not be specifically mentioned below are the same as those of the abovementioned embodiments. FIGS. 10A and 10B are front views each showing a display device 81 according to the fourth embodiment. FIG. 10A shows a state where the phase deviation occurs, and FIG. 10B shows a state where the phase matching is completed.

The display device 81 includes a plurality of light emitting portions 82 arranged in one direction. A light emitting state of these light emitting portions 82 changes, and thus both the turning angle of the wheels 4 and the steering angle of the steering wheel 13 are displayed. More specifically, the light emitting portion 82a indicating the turning angle of the wheels 4 emits, as the actual state display indicating the actual turning state of the wheels 4, light in a prescribed exclusive color (for example, blue) for the turning angle. Further, the light emitting portion 82b indicating the steering angle of the steering wheel 13 emits, as the actual state display, light in a prescribed exclusive color (for example, red) for the steering angle.

The light emitting portion 82c in the center of the display device 81 indicates a neutral point of the turning angle and the steering angle. The light emitting portion 82a indicating the turning angle and the light emitting portion 82b indicating the steering angle emit light on the right side or the left side of the neutral point according to the directions of the turning angle and the steering angle respectively. More specifically, at the left angle (the turning/steering angle on the left side), the light emitting portion 82 on the left side of the neutral point emits light in the prescribed exclusive color for the turning/steering angle. At the right angle (the turning/ steering angle on the right side), the light emitting portion 82 on the right side of the neutral point emits light in the prescribed exclusive color for the turning/steering angle. Accordingly, the driver can recognize the directions of the turning angle and the steering angle.

Further, each of the steering angle and the turning angle is converted into a level value and then displayed as the level value so that the driver can visually compare the magnitude of the steering angle with the magnitude of the turning angle and thus recognize the phase deviation state of the steering angle and the turning angle. In the display device 81, the distance between the neutral point and the light emitting portion 82a, 82b that emits light in the prescribed exclusive color for the turning angle becomes longer as the level value of the turning angle increases, and the distance between the neutral point and the light emitting portion 82a, 82b that emits light in the prescribed exclusive color for the steering angle becomes longer as the level value of the steering angle increases. Accordingly, the driver can recognize the magnitude of each of the turning angle and the steering angle.

Accordingly, as shown in FIG. 10A, when the phase deviation occurs, the light emitting portion 82a indicating the turning angle and the light emitting portion 82b indicating the steering angle deviate from each other. Accordingly, the driver can easily recognize the phase deviation state of the turning angle and the steering angle.

On the other hand, as shown in FIG. 10B, when the phase matching is completed, a matching state of the light emitting portion 82a indicating the turning angle and the light emitting portion 82b indicating the steering angle is displayed as a completion display indicating that the phase matching is completed. More specifically, one half of a light emitting portion 82 emits light in the prescribed exclusive color for the turning angle, and the other half of the same light emitting portion 82 emits light in the prescribed exclusive color for the steering angle. Accordingly, the driver can easily recognize that the phase matching is completed.

Incidentally, the light emitting portions 82 arranged between the neutral point and the light emitting portion 82a indicating the turning angle emit light in a prescribed color (for example, light blue) indicating the magnitude of the turning angle. Further, the light emitting portions 82 arranged between the neutral point and the light emitting portion 82b indicating the steering angle emit light in a prescribed color (for example, pink) indicating the magnitude of the steering angle. Incidentally, in the example shown in FIG. 10A, the turning angle and the steering angle fall into the similar phase deviation, and thus the light emitting portions 82 arranged between the neutral point and the light emitting portion 82a indicating the turning angle overlap with the light emitting portions 82 arranged between the neutral point and the light emitting portion 82b indicating the steering angle. In such a case, the light emitting portions 82 in the overlapping portion emit light in the prescribed exclusive color for the turning angle, which has priority over the steering angle.

In the present embodiment, as in the abovementioned embodiments, the driver is notified of the occurrence of the phase deviation, and the guidance display that prompts the driver to perform the phase matching operation to improve the phase deviation state is performed.

Further, in the present embodiment, the display device 81 includes the plurality of light emitting portions 82 arranged in one direction. However, each of the plurality of light emitting portions 82 may consist of one light source, and the lighting state (turning on, turning off, a lighting color, or the like) of each light source may be controlled. Further, the plurality of light emitting portions 82 may be displayed on a screen of a display panel such as a liquid crystal display panel.

The Fifth Embodiment

Next, a fifth embodiment will be described. The contents that will not be specifically mentioned below are the same as those of the abovementioned embodiments. FIG. 11 is a front view of a steering wheel 13 according to the fifth embodiment.

In the present embodiment, a rim portion 91 of the steering wheel 13 is provided with an annular vibrating portion 92. Upon detecting the phase deviation, the controller 21 vibrates the vibrating portion 92 so as to notify the driver that the phase deviation occurs. Accordingly, the driver can easily recognize the fact that the phase matching is required due to the occurrence of the phase deviation.

Further, in the vibrating portion 92, a plurality of vibrating elements is aligned in the circumferential direction thereof. The controller 21 vibrates the vibrating elements at a position corresponding to the phase deviation state so as to notify the driver of the phase deviation state. More specifically, the controller 21 vibrates the vibrating portion 92 at a position corresponding to the operation direction of the steering wheel 13 for the phase matching so as to notify the driver of the operation direction of the steering wheel 13 for the phase matching. For example, in a case where the counterclockwise rotation of the steering wheel 13 is required, the controller 21 generates vibration at a position on the left side of the vibrating portion 92. Accordingly, the driver can easily recognize the operation direction of the steering wheel 13 for the phase matching.

Further, the controller 21 may change the intensity of the vibration of the vibrating portion 92 according to the degree of the phase deviation (hereinafter referred to as "phase deviation degree") so as to notify the driver of the phase deviation degree according to the intensity of the vibration. Accordingly, the driver can easily recognize the phase deviation degree.

Incidentally, in the present embodiment, the vibrating portion 92 is arranged over the entire circumference of the rim portion 91 of the steering wheel 13. In this way, it is preferable that the vibrating portion 92 is arranged at least on each of left and right sides of the center of the steering wheel 13. Accordingly, the driver can recognize the operation direction of the steering wheel 13.

Further, the steering wheel 13 may be vibrated by using the vibration generated by a motor provided in the reaction force actuator 17. In such a case, intermittent vibration may be generated at the steering wheel 13 by rotating the motor intermittently. Accordingly, the driver can easily recognize the fact that the phase matching is required due to the occurrence of the phase deviation.

Further, the vehicle may be provided with the configuration for notifying the driver of the phase deviation according to the fifth embodiment in addition to the configuration for causing the display device 31 or the like to perform the display for the phase matching according to the first embodiment or the like. Accordingly, even in a case where the display device 31 or the like fails, it is possible to notify the driver that the phase matching is required due to the occurrence of the phase deviation.

Concrete embodiments of the present invention have been described in the foregoing, but the present invention should not be limited by the foregoing embodiments and various modifications and alterations are possible. For example, the specific configuration, arrangement, quantity, angle, procedure, or the like of each member and each portion may be appropriately changed within the scope of the present invention. Also, not all of the structural elements shown in the above embodiments are necessarily indispensable and they may be selectively adopted as appropriate.

The invention claimed is:

1. A vehicle system, comprising:
   a steering device including an operation member configured to be operated by a driver, a turning member mechanically separated from the operation member and configured to turn a wheel, a reaction force actuator configured to apply a reaction force to the operation member, and a turning actuator configured to drive the turning member;
   a controller configured to perform control relating to the steering device; and
   a display device configured to display information on the steering device,
   wherein the controller is configured to
   determine whether a steering angle of the operation member and a turning angle of the wheel are in a phase deviation state, and
   cause the display device to perform a guidance display and an actual state display in a case where the steering angle of the operation member and the turning angle of the wheel are in the phase deviation state, the guidance display prompting the driver to perform an operation for phase matching to improve the phase deviation state, the actual state display indicating an actual turning state of the wheel,
   wherein the controller is configured to cause the display device to display a first operation member image and a second operation member image in a superimposed state, the first operation member image indicating a current state of the operation member, the second operation member image indicating a target state of the phase matching.

2. The vehicle system according to claim 1, wherein the controller is configured to cause the display device to display a captured image as the actual state display, the captured image being captured by a camera configured to capture a lateral side of a vehicle body including the wheel.

3. The vehicle system according to claim 1, wherein the display device is configured to
   display a captured image captured by a camera configured to capture a front of a vehicle body, and
   display a prospective trajectory line as the actual state display on the captured image, the prospective trajectory line indicating a travel direction of a vehicle.

4. The vehicle system according to claim 1, wherein the display device includes a plurality of light emitting portions arranged in one direction, and
   the display device is configured to display both the turning angle and the steering angle as the actual state display by changing a light emitting state of the plurality of light emitting portions.

5. The vehicle system according to claim 1, wherein in a case where the phase matching is completed, the controller causes the display device to perform a completion display indicating that the phase matching is completed.

6. The vehicle system according to claim 1, wherein the display device is provided in the operation member, and
   the controller is configured to control the operation member so as to keep a screen direction constant even when the operation member rotates, the screen direction being a direction of a screen displayed on the display device.

7. The vehicle system according to claim 1, wherein the operation member includes a vibrating portion arranged at least on each of left and right sides of a center of the operation member, and
   in the phase deviation state, the controller vibrates the vibrating portion at a position corresponding to an operation direction of the operation member for the phase matching.

8. A vehicle system, comprising:
   a steering device including an operation member configured to be operated by a driver, a turning member mechanically separated from the operation member and configured to turn a wheel, a reaction force actuator configured to apply a reaction force to the operation member, and a turning actuator configured to drive the turning member;
   a controller configured to perform control relating to the steering device; and
   a display device configured to display information on the steering device,
   wherein the controller is configured to
   determine whether a steering angle of the operation member and a turning angle of the wheel are in a phase deviation state, and
   cause the display device to perform a guidance display and an actual state display in a case where the steering angle of the operation member and the turning angle of the wheel are in the phase deviation state, the guidance display prompting the driver to perform an operation for phase matching to improve the phase deviation state, the actual state display indicating an actual turning state of the wheel,
   wherein in the phase deviation state, the controller controls the reaction force actuator such that the reaction force applied to the operation member acts as a frictional reaction force that does not apply a restoring force to the operation member, and
   when the phase matching is completed, the controller controls the reaction force actuator so as to reduce the reaction force applied to the operation member.

9. A vehicle system, comprising:
   a steering device including an operation member configured to be operated by a driver, a turning member mechanically separated from the operation member and configured to turn a wheel, a reaction force actuator configured to apply a reaction force to the operation member, and a turning actuator configured to drive the turning member;
   a controller configured to perform control relating to the steering device; and
   a display device configured to display information on the steering device,
   wherein the controller is configured to
   determine whether a steering angle of the operation member and a turning angle of the wheel are in a phase deviation state, and
   cause the display device to perform a guidance display and an actual state display in a case where the steering angle of the operation member and the turning angle of the wheel are in the phase deviation state, the guidance display prompting the driver to perform an operation for phase matching to improve the phase deviation state, the actual state display indicating an actual turning state of the wheel, wherein the controller is configured to acquire information on an output state of the turning actuator, acquire information on the phase deviation state, determine whether the phase deviation state can be improved within a prescribed period by a driving force of the turning actuator based on the information on the output state and the information on the phase deviation state, and cause the display device to perform the guidance display and the actual state display upon determining that the phase deviation state cannot be improved within the prescribed period.

\* \* \* \* \*